(12) United States Patent
Griggs

(10) Patent No.: US 11,518,629 B2
(45) Date of Patent: Dec. 6, 2022

(54) MEASUREMENT SYSTEM ON A CONVEYOR

(71) Applicant: INTELLIGRATED HEADQUARTERS, LLC, Mason, OH (US)

(72) Inventor: Steven W. Griggs, Saint Charles, MO (US)

(73) Assignee: INTELLIGRATED HEADQUARTERS, LLC, Mason, OH (US)

(*) Notice: Subject to any disclaimer, the term of this patent is extended or adjusted under 35 U.S.C. 154(b) by 531 days.

(21) Appl. No.: 16/666,062

(22) Filed: Oct. 28, 2019

(65) Prior Publication Data

US 2021/0122589 A1 Apr. 29, 2021

(51) Int. Cl.
| | |
|---|---|
| *B65G 65/00* | (2006.01) |
| *B65G 15/26* | (2006.01) |
| *B65G 21/14* | (2006.01) |
| *B65G 67/02* | (2006.01) |
| *G01N 21/84* | (2006.01) |
| *B25J 9/00* | (2006.01) |

(52) U.S. Cl.
CPC .......... *B65G 65/005* (2013.01); *B25J 9/0093* (2013.01); *B65G 15/26* (2013.01); *B65G 21/14* (2013.01); *B65G 67/02* (2013.01); *G01N 21/84* (2013.01); *G01N 2021/8455* (2013.01)

(58) Field of Classification Search
CPC ....... B65G 21/14; B65G 15/26; B65G 65/005
See application file for complete search history.

(56) References Cited

U.S. PATENT DOCUMENTS

| | | | |
|---|---|---|---|
| 4,212,534 A | * | 7/1980 | Bodlaj ................... G01S 17/08 356/3.02 |
| 5,403,142 A | | 4/1995 | Stewart |

(Continued)

FOREIGN PATENT DOCUMENTS

| | | |
|---|---|---|
| CN | 104121856 A | 10/2014 |
| CN | 104909111 A | 9/2015 |

(Continued)

OTHER PUBLICATIONS

Extended European Search Report issued in European Application No. 20199478.7 dated Mar. 19, 2021, 9 pages.

(Continued)

*Primary Examiner* — Thomas Randazzo

(74) *Attorney, Agent, or Firm* — Alston & Bird LLP

(57) ABSTRACT

A measurement system used in conjunction with a conveyor includes a first sensor with a first transceiver and a second sensor with a second transceiver. The transceivers transmit a first light beam and a second light beam towards a movable portion of the conveyor. A control unit communicably coupled to the first sensor and the second sensor, wherein the control unit calculates a first distance between the first sensor and the movable portion based on the first sensor and a second distance between the second sensor and the movable portion based on the second sensor. The control unit determines a difference value between the first distance and the second distance; and stops the unloader in response to the difference value being above a predefined threshold value.

16 Claims, 6 Drawing Sheets

(56) References Cited

U.S. PATENT DOCUMENTS

| | | | | |
|---|---|---|---|---|
| 5,563,787 | A * | 10/1996 | Murayama | G05D 1/0246 |
| | | | | 356/152.3 |
| 5,699,161 | A | 12/1997 | Woodworth | |
| 5,850,282 | A * | 12/1998 | Egawa | G01S 7/4863 |
| | | | | 356/3.04 |
| 6,006,893 | A * | 12/1999 | Gilmore | B65G 21/14 |
| | | | | 198/588 |
| 7,168,555 | B2 * | 1/2007 | Peterson | B65G 43/00 |
| | | | | 198/588 |
| 9,045,289 | B2 * | 6/2015 | Carpenter | B65G 43/02 |
| 9,315,328 | B2 * | 4/2016 | Baek, IV | B65G 21/14 |
| 9,517,492 | B2 * | 12/2016 | Schwarzbauer | B07C 5/34 |
| 9,950,868 | B1 * | 4/2018 | Baek | B65G 21/14 |
| 2004/0112719 | A1 * | 6/2004 | Gilmore | A61L 31/16 |
| | | | | 414/398 |
| 2009/0110525 | A1 * | 4/2009 | Criswell | B65G 47/905 |
| | | | | 414/812 |
| 2010/0294624 | A1 | 11/2010 | Warner | |
| 2013/0228419 | A1 * | 9/2013 | Baek, IV | B65G 67/08 |
| | | | | 198/615 |
| 2015/0259149 | A1 * | 9/2015 | Hartmann | B65G 21/14 |
| | | | | 198/617 |

FOREIGN PATENT DOCUMENTS

| | | |
|---|---|---|
| CN | 204757934 U | 11/2015 |
| CN | 106395430 A | 2/2017 |
| CN | 109775250 A | 5/2019 |
| CN | 110023214 A | 7/2019 |
| WO | 2018/013876 A1 | 1/2018 |

OTHER PUBLICATIONS

CN Office Action dated Apr. 1, 2022 for CN Application No. 202011054355.

* cited by examiner

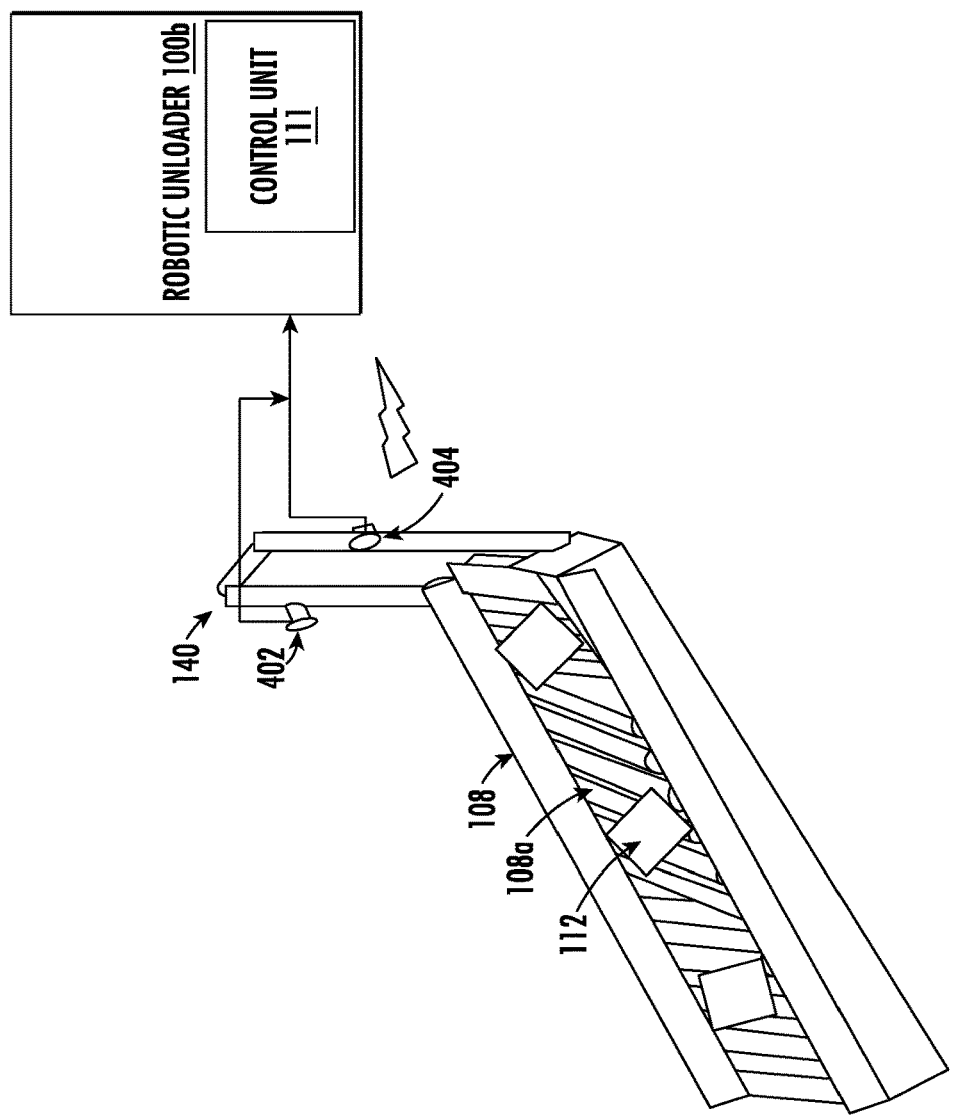
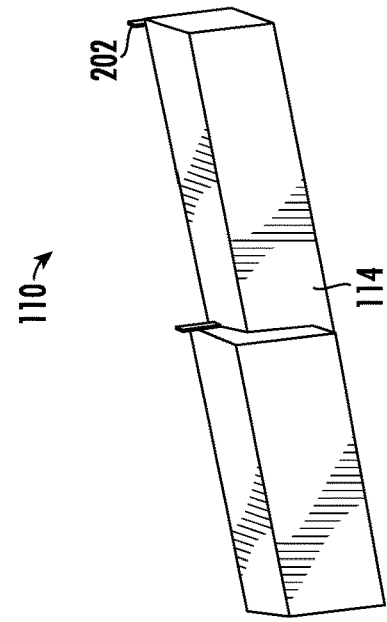
FIG. 4

MEASUREMENT SYSTEM ON A CONVEYOR

TECHNOLOGICAL FIELD

The present disclosure relates generally to a measurement system used in conjunction with a conveyor, and, more particularly, to a measurement system used for aligning a robotic unloader and an extendable conveyor in a warehouse environment for loading and unloading cartons.

BACKGROUND

Trucks and trailers loaded with cargo, cartons and products move across the country to deliver products to commercial loading and unloading docks at stores, warehouses, and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically unloaded with forklifts if the loads are palletized and with manual labor if the products are stacked within the trucks. Unloading large truck shipments manually with human laborers can be physically difficult, and can be costly due to the time and labor involved. Consequently, a need exists for an improved unloading system that can unload bulk quantities of stacked cartons and cargo from truck trailers more quickly than human laborers and at a reduced cost.

Further, the unloaded cargos or cartons are proceeded to further steps of processing in the warehouses and distribution centers. Often, a conveyor may aid in receiving the unloaded cargos or cartons from the unloading system and move it into multiple stations in the warehouse or distribution center for further processing. Consequently, a need exists for an improved conveying system which could be used in conjunction with the unloading system for efficient unloading of cartons or cargos in an autonomous manner without any manual intervention.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a measurement system used in conjunction with a conveyor. The measurement system includes a first sensor with a first transceiver and a second sensor with a second transceiver mounted on a fixed portion of the conveyor, wherein the first transceiver and the second transceiver respectively transmit a first light beam and a second light beam towards a movable portion of the conveyor. A control unit communicably coupled to the first sensor and the second sensor, wherein the control unit is configured to: calculate a first distance between the first sensor and the movable portion based on the first sensor detecting a first reflection of the first light beam from the movable portion of the conveyor while it is moving. Further, calculate a second distance between the second sensor and the movable portion based on the second sensor detecting a second reflection of the second light beam from the movable portion of the conveyor while it is moving. Further, the control unit is configured to determine a difference value between the first distance and the second distance and stop a movement of the movable portion of the conveyor in response to the difference value is above a predefined threshold value.

Various example embodiments described herein relate to a measurement system, wherein the first distance is calculated based on a first time difference between transmission of the first light beam and reception of the first reflection and the second distance is calculated based on a second time difference between transmission of the second light beam and reception of the second reflection.

Various example embodiments described herein relate to a measurement system, wherein the movable portion comprises a reflector, wherein the reflector reflects the first light beam and the second light beam.

Various example embodiments described herein relate to a measurement system, wherein the first light beam and the second light beam have a same wavelength.

Various example embodiments described herein relate to a measurement system, wherein the conveyor is an extendable conveyor.

Various example embodiments described herein relate to a measurement system, wherein the first transceiver and the second transceiver use at least one of visible, infra-red (IR) and ultraviolet (UV) light beams.

Various example embodiments described herein relate to a measurement system, wherein the conveyor comprises one or more portions nested within the fixed portion and extendable along a same plane of the fixed portion in a horizontal axis.

Various example embodiments described herein relate to a measurement system, wherein the predefined threshold value is associated with a tolerable deviation in distances values obtained from the first sensor and the second sensor.

Various example embodiments described herein relate to a manipulation system for loading and unloading cartons from a trailer. The manipulation system includes a robotic carton unloader, a first conveyor and a second conveyor. The first conveyor configured to receive the cartons thereon from the robotic carton unloader during an unloading process, wherein the first conveyor comprises a first sensor with a first transceiver mounted on the first conveyor to emit a light beam of a first wavelength. The second conveyor positioned at a rear end of the first conveyor to receive the cartons from the first conveyor and transfer the cartons to a processing station. The second conveyor comprises a measurement system to identify a position of the second conveyor in relation to the first conveyor. The measurement system comprises a second sensor with a second transceiver mounted on a fixed portion of the second conveyor, wherein the second transceiver emits a light beam of a second wavelength. In some embodiments, the first wavelength can be different than the second wavelength. In other embodiments, the first wavelength is the same as the second wavelength. A reflector mounted on a movable portion of the conveyor to reflect light beams back to the first sensor and the second sensor. A control unit communicably coupled to the first sensor and the second sensor, wherein the control unit is configured to: calculate a first distance between the first sensor and the reflector and a second distance between the second sensor and the reflector, wherein the first distance and the second distance are calculated based on the reflected light beams while the movable portion is in motion. The control unit is further configured to determine a position of the movable portion of the conveyor based on the first distance, the second distance and a length of the robotic carton unloader; determine if the movable portion of the conveyor is within a safe zone based on the position; and stop a movement of the movable portion of the conveyor when it is not within the safe zone.

Various example embodiments described herein relate to a manipulation system, wherein the length of the robotic carton unloader is predefined.

Various example embodiments described herein relate to a manipulation system, wherein the safe zone is at a predefined distance from a rear end of the robotic carton unloader.

Various example embodiments described herein relate to a manipulation system, wherein the control unit is further configured to determine if the movable portion of the second conveyor is within the predefined distance.

Various example embodiments described herein relate to a manipulation system, wherein the first conveyor is a MDR conveyor and the second conveyor is an extendable conveyor.

Various example embodiments described herein relate to a method for controlling extension of an extendable conveyor. The method includes calculating a first distance between a first sensor and a reflector based on a first reflected light beam received by the first sensor and then calculating a second distance between a second sensor and the reflector based on a second reflected light beam received by the second sensor, wherein the first sensor and the second sensor are positioned on a fixed portion of the extendable conveyor and the reflector is positioned on an extendable portion of the extendable conveyor. The method further includes determining a difference value between the first distance and the second distance and stopping a movement of the extendable portion of the conveyor in response to determining that the difference value is above a predefined threshold value.

Various example embodiments described herein relate a method, wherein the predefined threshold value is associated with a maximum tolerable deviation in distance values obtained from the first sensor and the second sensor.

Various example embodiments described herein relate a method including stopping the movement of the extendable portion of the conveyor when the reflected light beams are not received by at least one of the first sensor or the second sensor.

Various example embodiments described herein relate a method including determining a position of the extendable portion of the extendable conveyor based on the first distance and the second distance during a movement of the extendable conveyor; determining whether the extendable portion of the conveyor is within a safe zone based on the position; and stopping a movement of the extendable portion of the conveyor in response to determining the extendable portion of the conveyor is not in the safe zone.

Various example embodiments described herein relate a method including periodically determining whether the extendable portion is within the safe zone and extending the extendable portion in response to determining that the difference value is below the predefined threshold value.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4 illustrates a perspective view of a second measurement system mounted on the robotic unloader of FIG. 1, in accordance with an embodiment of the present disclosure.

DETAILED DESCRIPTION

Figure 1:
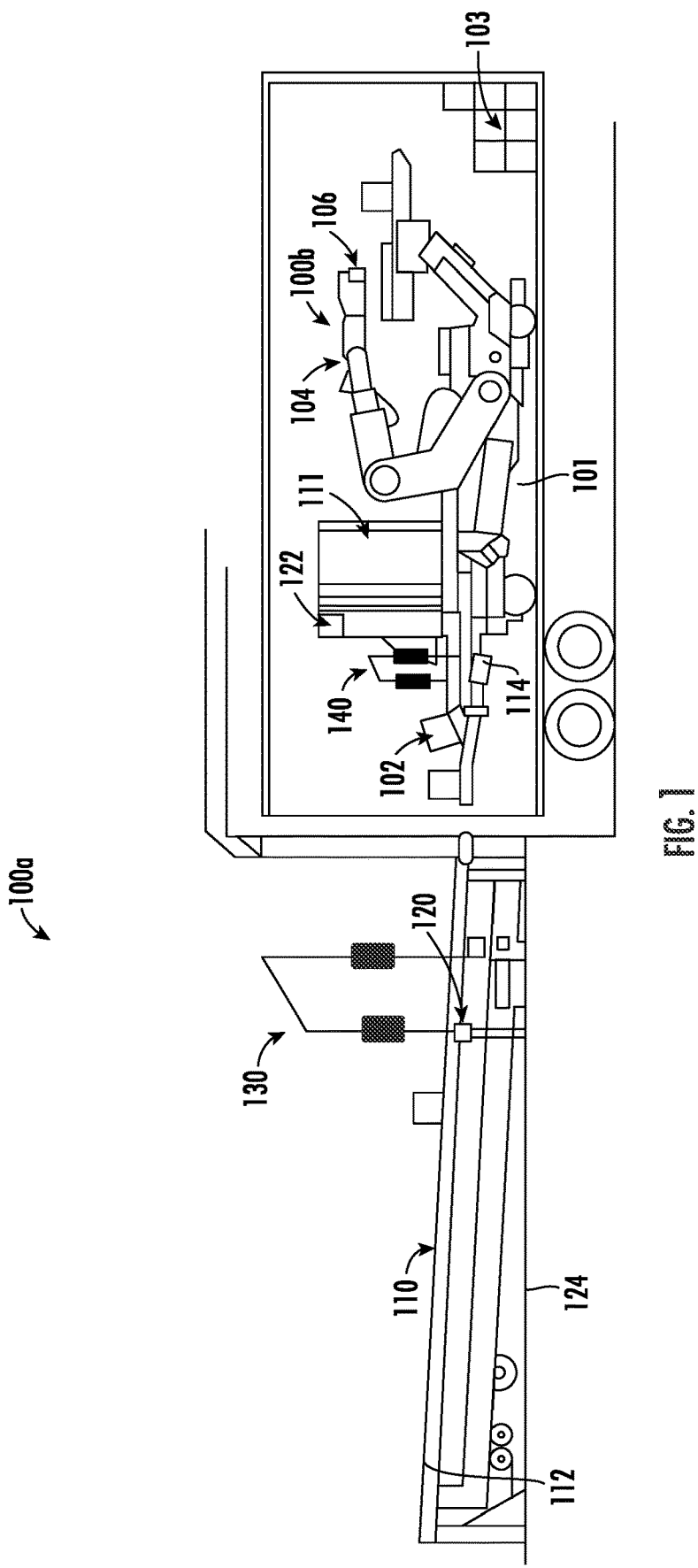
FIG. 1 illustrates a partial sectioned side view of a truck trailer with a robotic unloader positioned within, and interfacing with a conveyor, in accordance with an embodiment of the present disclosure.

Some embodiments of the present disclosure will now be described more fully hereinafter with reference to the accompanying drawings, in which some, but not all embodiments are shown. Indeed, the concepts described here may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

The term "conveyor" or "conveyor zone" or "conveyor system" or "conveyor bed" may be used interchangeably throughout the specification. The term "conveyor" may refer to an "extendable conveyor" according to one or more embodiment of the present disclosure.

The term "truck unloader" or "robotic unloader" or "carton unloader" or "robotic truck unloader" may be used interchangeably throughout the specification. All these terms refer to an autonomous device capable of loading and unloading cartons, cargos, or products in a warehouse environment without manual intervention.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denoting like components throughout the several views. However, it will be apparent to those skilled in the art that these concepts may be practiced without these specific details.

Generally, during loading and unloading operation, cartons or cargos are either directed towards a truck trailer from a warehouse or away from the truck trailer towards the warehouse. For example, during the loading operation cargos are conveyed towards the truck trailer from a particular station in the warehouse and during the unloading operation cargos are conveyed away the truck trailer towards the particular station in the warehouse for either storage or for further processing. In this regard, a conveyor, for example, an extendable conveyor may be used for conveying the cargos towards and away from the truck trailer. The extendable conveyor is often extendable up to a predefined distance based on a number of conveyor units nested within a support frame of the extendable conveyor. Generally, the extendable conveyor extends into the truck trailer either fully or partially to convey the cargos towards and away from the truck trailer based on a position of the truck trailer. In certain scenarios, the extendable conveyor extends to interface with another autonomous device inside the truck trailer. In certain scenarios, the extendable conveyor extends such that it can be operated by an operator personnel inside the truck trailer. Often, when the extendable conveyor extends, there exists a need to track an extent of the extension or distance travelled by the nested conveyor units of the extendable conveyor and a current position of the extendable conveyor to ensure that the extendable conveyor is within a safety limit. For example, if the extendable conveyor extends beyond the safety limit, there exists a possibility of collision with the truck trailer or autonomous device inside the truck trailer or with the operating personnel inside the truck trailer. Further, there also exits a need to ensure in real-time that each conveyor unit nested within the extendable conveyor is extending from the support frame without any glitch.

Various example embodiments described herein relate to a manipulation system including a measurement system which ensures that the extendable conveyor is operating within the safety limits without any glitch in the operation of the extendable conveyor. The measurement system is mounted on the extendable conveyor and includes at least two sensors with each sensor having a transceiver to transmit a first light beam and a second light beam. Both the light beams ae directed towards movable portions of the extendable conveyor. The movable portions are conveyor units nested within a fixed portion such as a support frame. The conveyor units are capable of extending towards the truck trailer. A control unit communicably coupled to the at least two sensors, wherein the control unit is configured to calculate a first distance and a second distance between the at least two sensors and the movable portions based on detecting a first reflection of the first light beam and a second reflection of the second light beam respectively. The first light beam and the second light beam are reflected from the movable portions. The control unit is further configured to determine a difference value between the first distance and the second distance and stop a movement of the unloader when the difference value is above a predefined threshold value.

According to an embodiment, the control unit is configured to calculate the first distance based on a first time-difference between transmission of the first light beam and reception of the first reflection and the second distance based on a second time-difference between transmission of the second light beam and reception of the second reflection.

According to another embodiment, the manipulation system includes a robotic carton unloader, a first conveyor, a second conveyor and a measurement system. The first conveyor configured to receive cartons thereon from the robotic carton unloader during an unloading process. The measurement system includes at least two sensors with transceivers mounted on the first conveyor. A control unit communicably coupled to the at least two sensors, wherein the control unit is configured to calculate a first distance and a second distance between the at least two sensors and the movable portions of the second conveyor.

According to yet another embodiment, the manipulation system includes a robotic carton unloader, a first conveyor, a second conveyor and a measurement system. The first conveyor configured to receive cartons thereon from the robotic carton unloader during an unloading process, wherein the first conveyor includes a senor with a transceiver and the second conveyor includes another sensor with a transceiver. Both the sensors are communicably coupled to the control unit and wherein the control unit is configured to calculate a first distance and a second distance between the at least two sensors and the movable portions of the second conveyor.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

FIG. 1 illustrates an embodiment of a manipulation system 100*a* including a robotic carton unloader 100*b* for unloading a container, truck trailer 101 and an extendable conveyor 110. The robotic carton unloader may interface with a conveyor, for example, an extendable conveyor 110 mounted to a floor 124 of a warehouse. Extendable conveyor 110 is depicted in FIG. 1 as a fully powered telescopic conveyor mounted to the floor 124 of a loading dock, but is not limited thereto. Robotic carton unloader 100*b* can unload cartons 102 from within a store, distribution center, or warehouse, and from the container, truck, or semi-trailer. In the example as shown in FIG. 1, the robotic carton unloader 100*b* can unload cartons 102 from the truck trailer 101. The term "robotic" of the robotic carton unloader 100*b* may mean completely autonomous operation without human intervention. Robotic carton unloader 100*b* in embodiments may include robotic arms 104 (or robotic carton retrieval arms) that may be of a straddle design and include end effectors 106 (e.g., vacuum manipulators) for retrieving items (e.g., cartons from a carton pile), conveyor systems (e.g., a descrambling conveyor), and mobile (or vehicle) bodies. Such embodiment robotic carton unloaders 100*b* may be suitable for efficient and fast unloading of items (e.g., cartons, cardboard boxes, any kind of product container for conveying products, etc.) from unloading areas, such as a truck (or semi) trailer, refrigerated areas, loading docks, etc. For example, a robotic carton unloader 100*b* according to various embodiments may be configured to drive into a truck trailer 101 via its mobile body, to dislodge or remove cartons 102 from a carton wall or carton pile 103 stacked on a floor of the truck trailer 101 via its end effector 106 (e.g., manipulator head) coupled to the robotic arm 104, and to transfer or unload the dislodged cartons 102 from the truck trailer 101 and into a store, warehouse, or distribution center unloading bay via its conveyor system 108 depicted in FIG. 4 that travels with the mobile body and outputs the cartons 102 to other conveyors, such as, the extendable conveyor 110. Such embodiment robotic carton unloaders 100*b* may be capable of removing a substantial portion of a row of items (e.g., a carton row) that extends side-to-side across an unloading area (e.g., truck trailer 101) with one removal action. For example, such robotic carton unloaders 100*b* may be configured to remove between about 40% to about 100b % of a carton row in one movement. Designed to move within space-constrained unloading areas, such embodiment robotic carton unloaders 100*b* may minimize the time and effort required to efficiently unload and provide basic organization for items being moved for subsequent processing within facilities, such as distribution centers.

The robotic carton unloader 100*b* includes a control unit or (control and visualization system) including a processor and attached to the robotic carton unloader 100*b* for autonomous robotic control of robotic carton unloader 100*b*. The control unit 111 can control the unloading process without human intervention. The control unit 111 may visualize or sense the surroundings, may use the sensing to perform computations to identify and select cartons 102 for removal. The control unit 111 can constantly re-sense and re-compute all autonomous actions necessary to unload an entire truck trailer 101 from rear to front. The control unit 111 may include various visualization sensors (e.g., cameras, etc.), operator interfaces (e.g., joysticks, pendants, displays, keypads, etc.), and processors, and may be capable of controlling and automating the unloading process, and driving and steering the robotic carton unloader 100*b* into and out of unloading areas (e.g., truck trailers 101) before, during, and after the unloading process. The control unit 111 can be used to compute the location of the wall of carton piles 103 relative to robotic carton unloader 100*b* and the end effector 106 and can autonomously control and move the robotic arm 104 to unload of cartons 102 from the carton pile 103 and place the unloaded cartons 102 onto the conveyor system 108 for conveyance onto the extendable conveyor 110. The control unit 111 may also include a memory which stores predefined values such as, but not limited to, length of the robotic carton unloader 100*b*, length of the extendable conveyor 110 when fully extended or fully retracted, number of conveyor units nested within a support frame or a fixed portion of the extendable conveyor 110, a position of the fixed portion or support frame of the extendable conveyor 110, a safety zone defined relative to inner walls or outer walls of the truck trailer 101, a safety zone defined relative to rear end of the robotic carton unloader 100*b*.

By way of example, the robotic carton unloader 100*b* may, under the control of the control unit 111, operate without any human intervention as it moves from the warehouse, through a loading door, into the struck trailer 101, unloads the cartons 102 within entire truck trailer 101 from rear to front, and then exit from the truck trailer 101 back into the warehouse to access another truck trailer at the same or a different location. The control unit 111 can at least visualize or sense the warehouse, the loading door, the interior of the truck trailer 101, a carton wall or carton pile 103 stacked on floor of the truck trailer 101, and individual cartons 102 of all sizes and shapes thereof, and can autonomously compute all movements necessary to move and steer the robotic carton unloader 100*b* during the unloading process.

Figure 2:
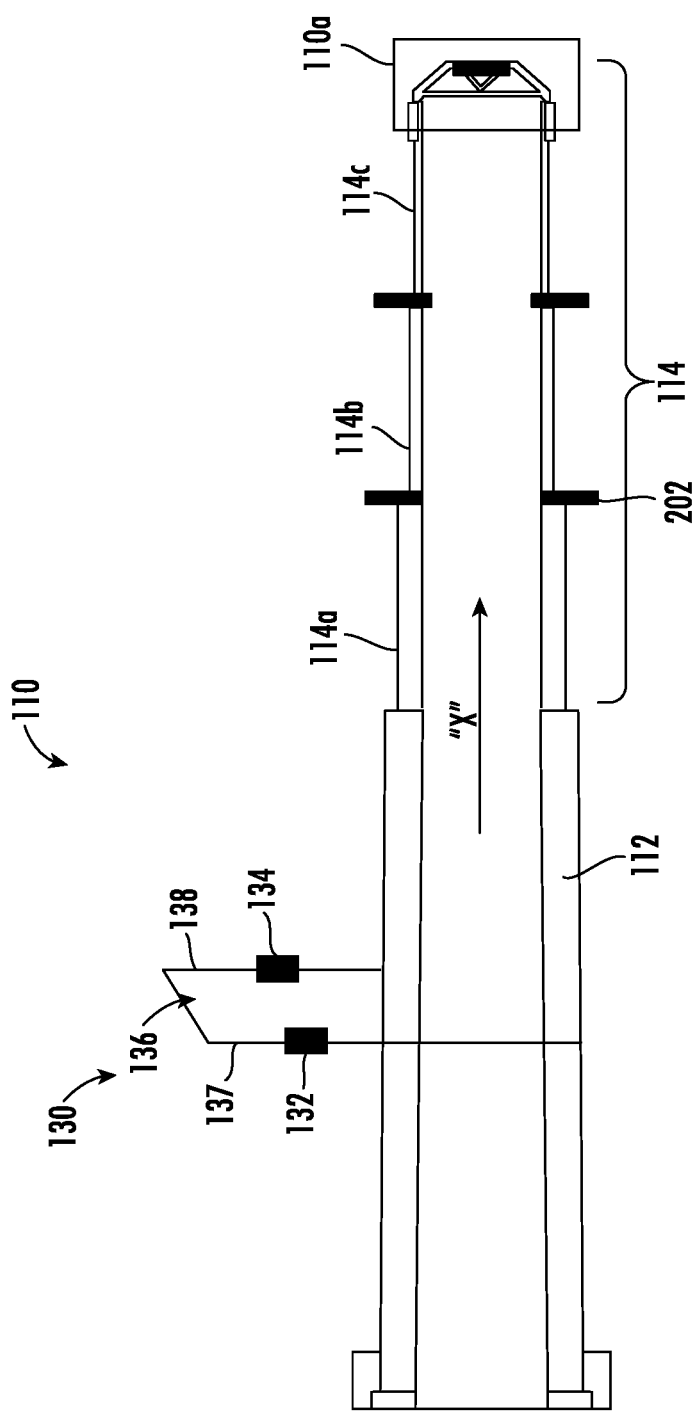
FIG. 2 illustrates a top view of the conveyor of FIG. 1 with a measurement system, in accordance with an embodiment of the present disclosure.

The robotic carton unloader 100*b* and the extendable conveyor 110 may include measurement systems, for example, a first measurement system 130 and a second measurement system 140. Each of the measurement systems 130, 140 may include at least one sensor to detect, for example, a position information of the extendable conveyor 110. The second measurement system 140 on the robotic carton unloader 100*b* may be communicably connected to the first measurement system 130 on the extendable conveyor 110. As shown in FIG. 1, the robotic carton unloader 100*b* includes a conveyor system 108 configured to receive the cartons 102 thereon from the robotic carton unloader 100*b* during an unloading process. The second measurement system 140 may be positioned on the conveyor system 108. According to an embodiment, the manipulation system 100*a* may include only one measurement system, for example, a first measurement system 130 positioned on the extendable conveyor 110 to detect the position information of the extendable conveyor 110 as shown in FIG. 2. Both the measurement systems 130, 140 may be communicably coupled to the control unit 111. Communication between the robotic carton unloader 100*b* and the extendable conveyor 110 can be through a communications link such as, but not limited to, a wireless system, laser, infrared, visible light, or an Ethernet cable. An example of a communications link can be seen in FIG. 3 with an unloader wireless unit 120 on robotic carton unloader and an extendable wireless link 122 on the extendable conveyor 110, for example, a cable such as an Ethernet cable may link the control unit 111 to the extendable conveyor 110 to send extension and retraction commands thereto.

The control unit 111 may use the position information of the extendable conveyor 110 to extend or retract the extendable conveyor 110 and may calculate and control extension and retraction movements of the extendable conveyor 110 to move in unison with the forward and reverse movements of the robotic carton unloader 100*b*. The control unit 111 may interface the extendable conveyor 110 to the robotic carton unloader 100*b* to receive unloaded cartons onto the extendable conveyor 110, and control unit 111 may continually maintain this carton receiving relationship to provide a continuous flow of cartons 102 from the robotic carton unloader 100*b* onto extendable conveyor 110 throughout the unloading of the truck trailer 101. The control unit 111 can maintain this carton 102 receiving relationship relative to the robotic carton unloader 100*b* during the unloading process by calculating and communicating extension and retraction movements of the extendable conveyor 110.

Figure 6:
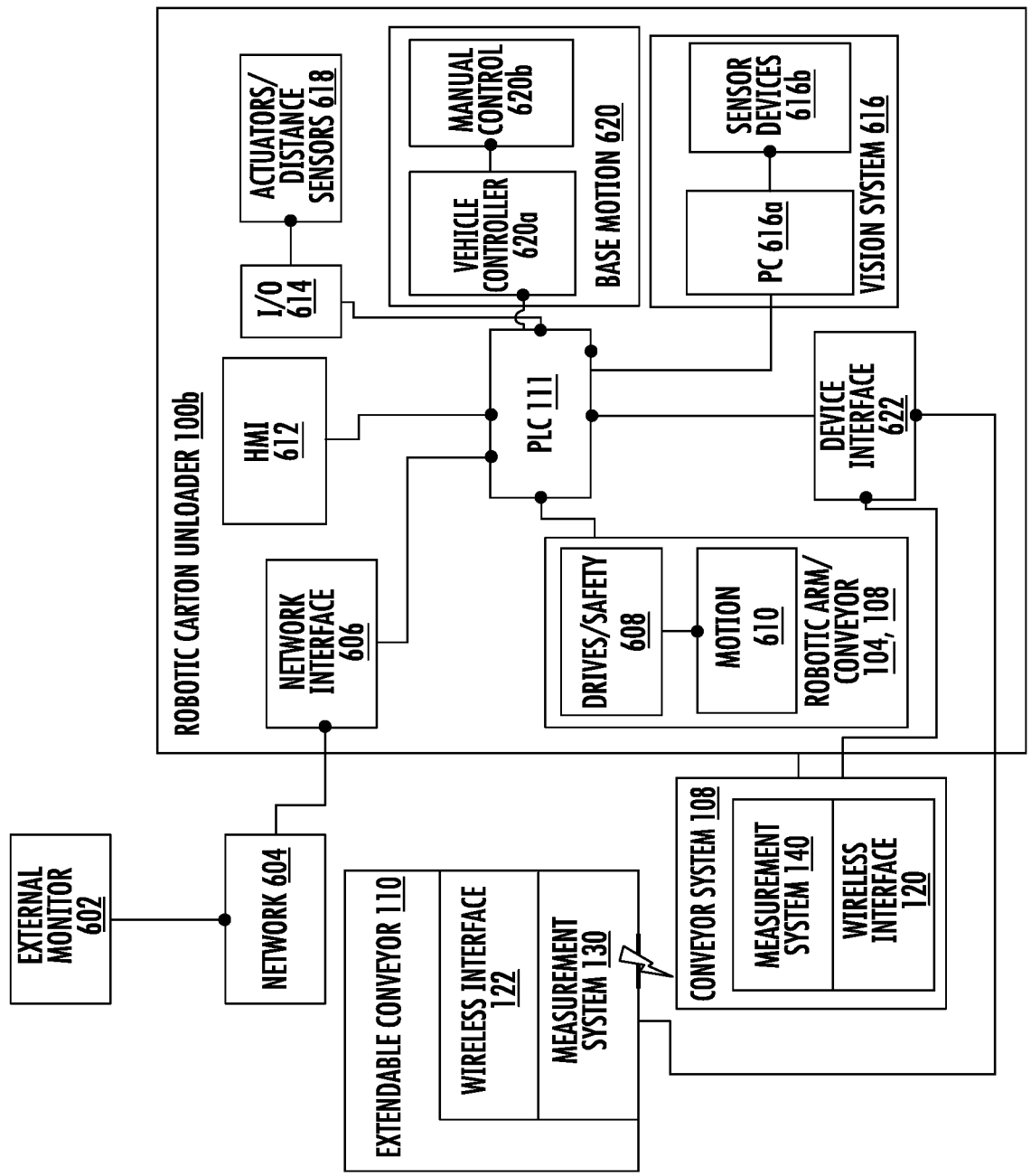
FIG. 6 illustrates an exemplary computing environment for an onboard unloading control unit of the robotic unloader of FIG. 1, in accordance with an embodiment of the present disclosure.

In embodiments, the electrical and software functions of the measurement systems 130, 140 on the extendable conveyor 110 and the robotic carton unloader 100*b* may be included as part of the control unit 111 on the robotic carton unloader 100*b* of FIGS. 1 and 6. Control unit 111 can use the position information from the measurement systems 130, 140 to either control forward and reverse motion of the robotic carton unloader 100*b* or communicate extension and retraction commands to the extendable conveyor 110. If desired, portions of the control unit 111 can be split to be partially on the robotic carton unloader 100*b* and the electrical hardware and software functions of the measurement systems 130, 140 can be split between the control unit 111 and extendable conveyor 110. Each portion can be slaved to the control unit 111 on the robotic carton unloader 100*b*. In embodiments, either or both of the robotic carton unloader 100*b* and the extendable conveyor 110 may be configured to be operated by a human operator, and then may be reconfigured back to autonomous operation.

The automated features of the manipulation system 100*a* in unison with the robotic carton unloader 100*b* operate without human intervention, and can ensure that the extendable conveyor 110 and the robotic carton unloader 100*b* provide a continuous unbroken conveying path between the robotic carton unloader 100*b* and the extendable conveyor 110.

Embodiments of robotic carton unloader 100*b* can include embodiments described in co-pending parent U.S. application Ser. No. 14/471,795, entitled "Robotic Carton Unloader" filed Aug. 28, 2014, the entire contents of which are hereby incorporated by reference in their entirety. The measurement systems 130, 140 described in detail below in conjunction with FIGS. 2-6 is not limited to use with the robotic carton unloader 100 and could be adapted for use with other robotic carton unloaders.

FIG. 2 illustrates a top view of the conveyor of FIG. 1 with a measurement system, in accordance with an embodiment of the present disclosure. The measurement system 130 is mounted on the conveyor 110. The conveyor 110 shown in FIG. 2 is an extendable conveyor 110 as shown in FIG. 1 with a fixed portion 112 and movable portions 114. The fixed portion 112 and the movable portions 114 are conveyor units. In some examples, the fixed portion 112 may be a support frame. The conveyor units, for example, may be roller conveyor units or belt conveyor units. In FIG. 2, three movable portions 114*a*, 114*b*, and 114*c*, for example, three nested conveyor units are shown in a fully extend position. The three movable portions 114*a*, 114*b*, and 114*c* may be supported by the fixed portion 112 in a cantilever manner. According to an embodiment, a length of each of the movable portions 114 may be same. According to another embodiment, the length of each of the movable portions 114 may be varying. According to an embodiment, the measurement system 130 is mounted on the fixed portion 112 or the support frame of the extendable conveyor 110. In some examples, the measurement system 130 may be positioned at a known distance from either a rear end or a front end of the fixed portion 112.

According to an embodiment, the measurement system 130 includes a first sensor 132 with a first transceiver and a second sensor 134 with a second transceiver mounted on a fixed portion 112 of the conveyor 110. The first transceiver and the second transceiver respectively transmit a first light beam and a second light beam towards a movable portion 114 of the conveyor 110. The first sensor 132 and the second sensor 134 may be optic sensors, for example, laser sensors. For example, the first light beam and the second light beam may be laser beams directed towards the movable portion 114, for example, nested conveyor units. The laser beams are directed when the movable portions 114 (i.e. the nested conveyor units) of the extendable conveyor 110 are in motion. For example, the laser beams are directed when the movable portions 114 are extending from the fixed portion 112 towards a rear of the robotic carton unloader 110 to interface with the conveyor system 108.

According to an embodiment, the first sensor 132 and the second sensor 134 are mounted on cross-member support beam 136 positioned on the fixed portion 112. The cross-member support beam 136 includes two poles 137, 138 positioned opposite to each other with the first sensor 132 attached to a first pole 137 and the second sensor 134 attached to a second pole 138. According to an embodiment, the first sensor 132 and the second sensor 134 may be positioned at the same height in the first pole 137 and the second pole 138. According to another embodiment, the first sensor 132 and the second sensor 134 may be attached to either the first pole 137 or the second pole 138 and positioned at either the same height or different height.

According to an embodiment, the first light beam and the second light beam directed from the first sensor 132 and the second sensor 134 are reflected back from the movable portions 114 of the conveyor 110 to the first sensor 132 and the second sensor 134. The first sensor 132 and the second sensor 134 receives the first reflection and the second reflection from the movable portions 114 of the conveyor 110.

According to an embodiment, the first light beam and the second light beam directed from the first sensor 132 and the second sensor 134 are reflected back from reflectors 202 positioned on the movable portions 114 of the conveyor 110. In some examples, the reflectors 202 are positioned on each of the movable portions 114*a*, 114*b*, and 114*c* (i.e., each of the nested conveyor units). In some examples, only one reflector 202 is positioned on one of the nested unit, for example, a first nested conveyor unit 114*a* or a third nested conveyor unit 114*c*. In other embodiments, the reflectors 202 may be positioned at a front end of each of the nested conveyor units 114. According to an embodiment, one or more reflectors 202 may be attached to each nested conveyor units 114. In FIG. 2, each of the nested conveyor units 114 may include at least two reflectors 202. The first sensor 132 and the second sensor 134 receives the first reflection and the second reflection from the reflectors 202 mounted on the movable portions 112 of the conveyor 110. In some examples, the reflector 202 may be a retroreflector. For example, the transceiver of the first sensor 132 and the second sensor 134 receives the first reflection and the second reflection from one of the reflectors 202 and uses the electric circuit arrangement which converts the reflections into an electric signal.

According to an embodiment, one of the reflector 202 reflects the light beams when the movable portions 114 of the conveyor 110 is in motion. For example, the sensors 132, 134 on the fixed portion 112 emit the light beams and the reflector 202 of the first nested conveyor unit 114*a* may reflect the emitted light beams back to the sensors 132, 134 while the nested conveyor units 114 extend in a direction "X" in a horizontal axis from the fixed portion 112 of the conveyor 110 along a same plane of the fixed portion 112. The reflected light beams are converted into electric signals which is then processed by the control unit 111 to determine a distance between the movable portions 114 of the conveyor 110 and the sensors 132, 134. For example, the control unit 111 calculates a first distance between the first sensor 132 and the first nested conveyor unit 114*a* based on the first sensor 132 detecting a first reflection of the first light beam from the first nested conveyor unit 114*a* of the conveyor 110 while it is moving. Further, the control unit 111 calculates a second distance between the second sensor 134 and the first nested conveyor unit 114a based on the second sensor 134 detecting a second reflection of the second light beam from the first nested conveyor unit 114a of the conveyor 110 while it is moving. The first distance can be calculated based on a first time difference between transmission of the first light beam and reception of the first reflection and the second distance is calculated based on a second time difference between transmission of the second light beam and reception of the second reflection. According to an embodiment, the first distance is calculated based on the first time difference and velocity of the light beam; and the second distance is calculated based on the second time difference and the velocity of the light beam. In other embodiments, other determinations for the distances can be used. The total distance travelled by the nested conveyor units 114 is calculated by multiplying the distance of the first nested conveyor unit 114a from the fixed portion 112 with number of nested conveying units 114, which in the example embodiment of FIG. 2 is three. In some examples, when the third nested conveyor unit 114c includes the reflector 202, the total distance travelled by the extendable conveyor 110 is the actual distance of the third conveyor unit 114c from the fixed portion 112 calculated by the control unit 111.

According to an embodiment, the first distance and the second distance may be calculated by use of both the first measurement system 130 and the second measurement system 140 as shown in FIG. 1. For example, the second measurement system 140 positioned on the conveyor system 108 of the robotic unloader 100b may include a sensor with a first transceiver mounted to emit a light beam of a first wavelength and the first measurement system 130 positioned on the extendable conveyor 110 may include another sensor with a second transceiver to emit a light beam of a second wavelength. The light beams of the first wavelength and the second wavelength are reflected back by the reflectors 202 mounted on the movable portions 114 of the extendable conveyor 110. In some examples, the sensors may direct the light beams to the reflector 202 on the third nested conveyor unit 114c. The control unit 111 which is communicably coupled to the first measurement system 130 and the second measurement system 140 receives the reflected light beams from the reflector 202 and calculates the first distance and the second distance.

According to an embodiment, the first distance and the second distance obtained from the first measurement system 130 and the second measurement system 140 may be used in identifying the position of the unloader 100b relative to the position of the fixed portion 112 of the extendable conveyor 110. The first distance may be indicative of the extent of extension of the extendable conveyor 202 at any given point of time. The second distance may be indicative of the gap between the end of the extendable conveyor 202b and the unloader 100b. Using the first distance and the second distance, the control unit 111 calculates the position of the unloader 100b relative to the position of the fixed portion 112 of the extendable conveyor 110. Using this distance and known length of the robotic carton unloader 100b predefined in the memory of the control unit 111, the control unit 111 computes a position of the nose portion of the unloader 100b relative to the position of the fixed portion 112 of the extendable conveyor 110. In some examples, the position is determined to ensure that the nose portion unloader 100b is within a safe zone. In some examples, the safe zone may be predefined and stored in the memory of the control unit 111. In some examples, the safe zone may be defined in the memory using Cartesian coordinates. The position of the nose portion unloader 100b may be compared to the safe zone and movement of the unloader 100b or further extension of the nose portion 110b of the extendable conveyor 110 is stopped when the unloader 100b is not within the safe zone.

According to another embodiment, a difference value between the first distance and the second distance is calculated by the control unit 111. The difference value is then compared to a predefined threshold value. If the difference value is greater than the predefined threshold value, then the movement of the extendable conveyor 110 is stopped. In some example, the predefined threshold value is associated with a maximum tolerable deviation in distance values obtained from the first sensor 132 and the second sensor 134. This ensures that the extendable conveyor 110 is not extended beyond a certain threshold level in order to ensure safety when interfacing the extendable conveyor 110 with the conveyor system 108 of the robotic carton unloader 100b.

According to another embodiment, measured distance values are used to determine the location of the unloader. If position is outside of predetermined bounds the controller will stop the unloader. Stopping the unloader will subsequently stop the extendable. The distance data may not be used to directly control the extendable conveyor in some embodiments, but may control the extendable conveyor in other embodiments.

Figure 3:
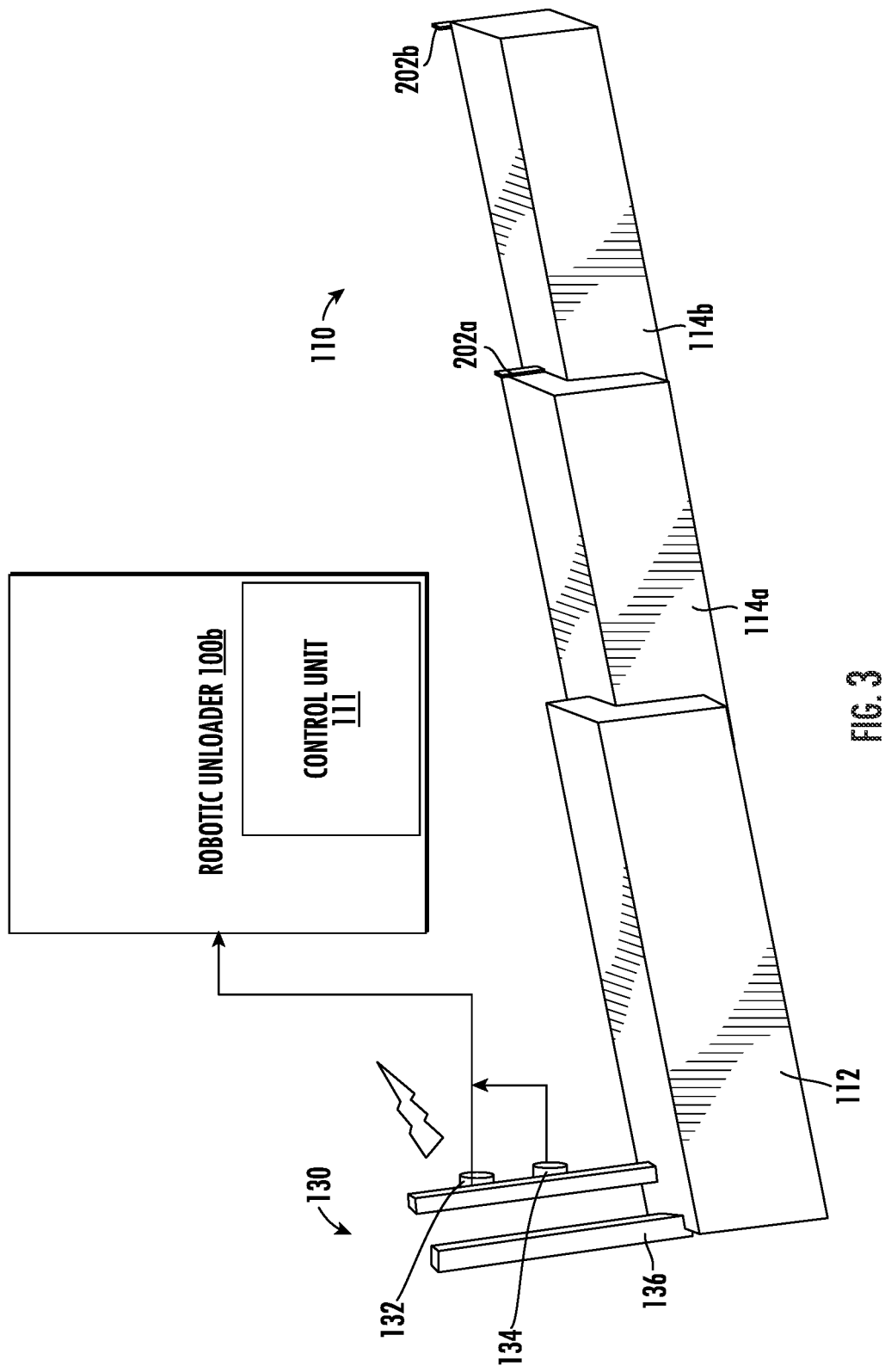
FIG. 3 illustrates a perspective view of a first measurement system mounted on the conveyor of FIG. 1, in accordance with an embodiment of the present disclosure.

FIG. 3 illustrates a perspective view of a first measurement system mounted on the conveyor of FIG. 1, in accordance with an embodiment of the present disclosure. In FIG. 3, the first measurement system 130 is mounted to one of the poles 137, 138 of the cross-member support 136 of the extendable conveyor 110 shown in FIG. 2. For example, the first measurement system 130 which includes the first sensor 132 and the second sensor 134 are positioned on one pole 138 of the cross-member support 136 in a sequential manner (i.e.,) the second sensor 134 is positioned below the first sensor 132. According to another embodiment, the first sensor 132 and the second sensor 134 may be installed on one pole 138 in a parallel manner (i.e.,) a first sensor 132 on a first side 132a of the pole 138 and the second sensor 134 on a second side 132b (not shown) opposite to the first side 132a. Both these sensors 132, 134 emit light beams of either a same wavelength or different wavelength. According to an embodiment, the construction and structure of the first sensor 132 and the second sensor 134 may not be identical. Both the sensors 132, 134 are oriented in a manner to receive reflected light beams from the reflectors 202 mounted in each nested conveyor unit 114 of the extendable conveyor 110. In some examples, the first sensor 132 may be oriented to receive reflections from the first reflector 202a positioned on a first nested conveyor unit 114a and the second sensor 134 may be oriented to receive reflections from the second reflector 202b positioned on a second nested conveyor unit 114b. The reflections are analyzed by the control unit 111 communicably coupled to the first sensor 132 and the second senor 134 to obtain a distance travelled by the movable portions 114 of the extendable conveyor 110. For example, the distance travelled by the first nested conveyor unit 114a and the second nested conveyor unit 114b may be summed up to obtain a total distance traveled by the extendable conveyor 110.

FIG. 4 illustrates a perspective view of a second measurement system mounted on the robotic unloader of FIG. 1, in accordance with an embodiment of the present disclosure. In FIG. 4, the second measurement system 140 is mounted to a cross-member support 142 on the conveyor system 108 of the robotic carton unloader 100b. The conveyor system 108 may be a gravity roller conveyor. The second measurement system 140 includes two sensors, for example, a third sensor 402 and a fourth sensor 404. Both these sensors 402, 404 emit light beams of either a same wavelength or different wavelength. Both the sensors 402, 404 are oriented in a manner to receive reflected light beams from the reflectors 202 mounted on the nose portion 110a of the extendable conveyor 110. The reflections from the reflector 202 on the nose portion 110a are analyzed by the control unit 111 communicably coupled to the third sensor 402 and the fourth sensor 404 measure a gap between the extendable conveyor and the robotic truck unloader. According to an embodiment, a position of the nose portion 110a of the extendable conveyor 110 is identified based on the distance travelled, a known position of the fixed portion 112 of the extendable conveyor 110, and the known length of the robotic truck unloader 100b.

According to an embodiment, the construction and structure of the third sensor 402 and the fourth sensor 404 may not be identical. According to an embodiment, the construction and structure of the first sensor 132, the second sensor 134, the third sensor 402 and the fourth sensor 404 may be identical. According to another embodiment, the construction and structure of the first sensor 132 and the second sensor 134 may be identical; and the third sensor 402 and the fourth sensor 404 may be identical but different from the construction of the first sensor 132 and the second sensor 134. According to an embodiment, the first measurement system 130 can determine a distance that of an extended extendable conveyor 110 and second measurement system 140 can measure a gap between the end of extendable conveyor 110b and the unloader 100b. According to an embodiment, the second measurement system 140 and the first measurement system 130 may be used in conjunction to accurately determine the position of the unloader 100b.

Figure 5:
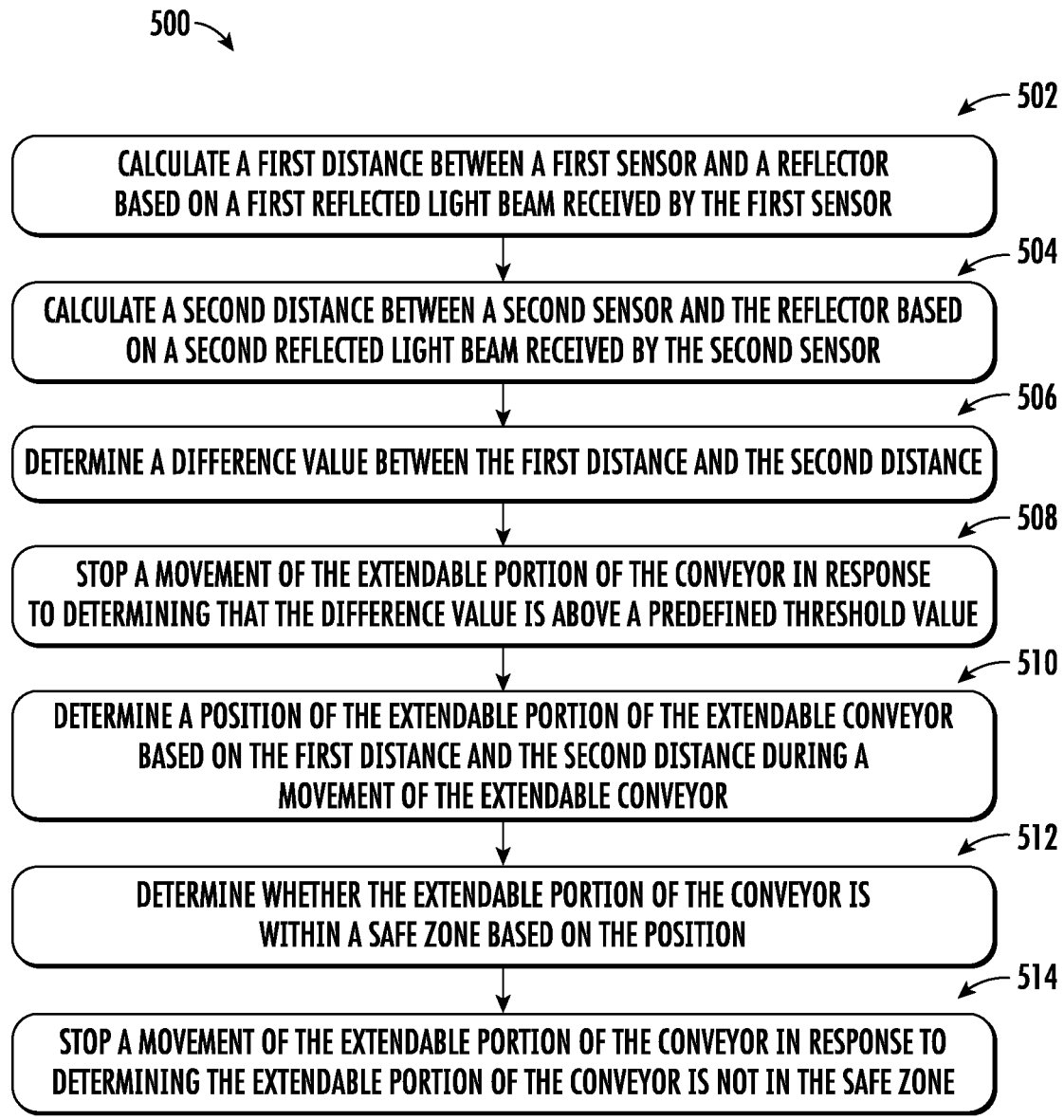
FIG. 5 illustrates a method of operating the conveyor using the measurement systems of FIGS. 3 and 4, in accordance with an embodiment of the present disclosure.

FIG. 5 illustrates a method of operating the conveyor using the measurement systems of FIGS. 3 and 4, in accordance with an embodiment of the present disclosure. The measurement system on both the extendable conveyor and the conveyor of the robotic truck unloader are communicably coupled to the control unit of the robotic nick unloader. Using the input signals in the form of electric signals indicative of light reflections on the sensors, the control unit, at step 502 and 504, calculates a first distance and a second distance between the sensors and reflectors. The first sensor and the second sensor are positioned on a fixed portion of the extendable conveyor and the reflector is positioned on an extendable portion of the extendable conveyor. At step 506, the control unit determines a difference value between the first distance and the second distance; and at step 508, the control unit stops a movement of the extendable portion of the extendable conveyor in response to determining that the difference value is above a predefined threshold value. The predefined threshold value is a maximum tolerable deviation in distance values obtained from the first sensor and the second sensor. In some examples, the control unit stops the movement of the unloader and extendable conveyor when either the first sensor or the second sensor does not receive the corresponding reflections from the reflector. Further, at step 510, the control unit determines a position of the unloader based on the first distance and the second distance during a movement of the extendable conveyor. The position of the unloader may be derived based on the known length of the robotic truck unloader, a known position of the fixed portion of the extendable conveyor, and the distance the extendable conveyor is extended. Further, at step 512, the control unit determines whether the unloader is within a safe zone based on the position. The safe zone, for example, may be defined in the form of Cartesian coordinates. Further, at step 514, the control unit stops a movement of the unloader in response to determining that the unloader is not in the safe zone. When the position of the unloader is within the safe zone, then the control unit may move the unloader and extend the extendable portion. In this manner, the control unit periodically determines whether the unloader is within the safe zone and moves the unloader and extends the extendable portion in response to determining that the difference value in the calculated distance is below the predefined threshold value.

FIG. 6 illustrates an exemplary computing environment for an onboard unloading control unit of the robotic unloader of FIG. 1, in accordance with an embodiment of the present disclosure. Depending on embodiments listed above, each of the control unit 111 of the robotic carton unloader 100b may comprise all or some of an external monitor 602, a network interface module 606, an HMI module 612, an input/output module (I/O module 614), an actuators/distance sensors module 618, a robotic arm 104 and a conveyor system 108 that includes a drives/safety module 608 and a motion module 610, a programmable logic controller (or PLC 111, and a vision system 616 (or visualization system) that may include one or more computing devices 616a (or "PCs") and sensor devices 616b. In some embodiments, vision system 616 of the robotic carton unloader 100b may include a PC 616a connected to each sensor device 616b. In embodiments in which more than one sensor device 616b is present on the robotic carton unloader 100b, the PCs 616a for each sensor device 616b may be networked together and one of the PC's 616a may operate as a master PC 616a receiving data from the other connected PC's 616a, may perform data processing on the received data and its own data (e.g., coordinate transformation, duplicate elimination, error checking, etc.), and may output the combined and processed data from all the PCs 616a to the PLC 111. In some embodiments, the network Interface module 606 may not have a PLC inline between it and the PC 616a, and the PLC 111 may serve as the Vehicle Controller and/or Drives/Safety system.

The robotic carton unloader 100b may connect to remote locations or systems with a network interface module 606 (e.g., a Wi-Fi™ radio, etc.) via a network 604, such as a local area Wi-Fi™ network. In particular, the network interface module 606 may enable the robotic carton unloader 100b to connect to an external monitor 602. The external monitor 602 may be anyone of a remote warehouse or distribution center control room, a handheld controller, or a computer, and may provide passive remote viewing through the vision system 616 of the robotic carton unloader 100b. Programming for the robotic carton unloader 100b may also be communicated, operated and debugged through external systems, such as the external monitor 602. Examples of an external monitor 602 that assumes command and control may include a remotely located human operator or a remote system, such as a warehouse or distribution server system (i.e., remote device as described above). Exemplary embodiments of using an external monitor 602 to assume command and control of the robotic carton unloader 100b may include human or computer intervention in moving the robotic carton unloader 100b, such as from one unloading bay to another, or having the external monitor 602 assume control of the robotic arm 104 to remove an item (e.g., box, carton, etc.) that is difficult to unload with autonomous routines. The external monitor 602 may include any of: a visual monitor, a keyboard, a joystick, an I/O port, a CD reader, a computer, a server, a handheld programming device, or any other device that may be used to perform any part of the above described embodiments.

The robotic carton unloader 100b may include a human machine interface module 612 (or HMI module 612) that may be used to control and/or receive output information for the robot arm and conveyor system 108 and/or the base motion module 620. The HMI module 612 may be used to control (or may itself include) a display, and a keypad that may be used for, over-riding the autonomous control of the machine, and driving the robotic carton unloader 100b from point to point. The actuators 618 that may be actuated individually or in any combination by the vision system 616 and the distance sensors may be used to assist in guiding the robotic carton unloader 100b into an unloaded area (e.g., a trailer). The I/O module 614 may connect the actuators and distance sensors 618 to the PLC 111. The robotic arm 104 and conveyor system 108 may include all components needed to move the arm and/or the conveyor, such as drives/engines and motion protocols or controls.

The PLC 111 that may control the overall electromechanical movements of the robotic carton unloader 100b or control exemplary functions, such as controlling the robotic arm 104 or a conveyor system 108. For example, the PLC 111 may move the manipulator head of the robotic arm 104 into position for obtaining items (e.g., boxes, cartons, etc.) from a wall of items. As another example, the PLC 111 may control the activation, speed, and direction of rotation of kick rollers, and/or various adjustments of a support mechanism configured to move a front-end shelf conveyor (e.g., front-end shelf conveyor). The PLC 111 and other electronic elements of the vision system 616 may mount in an electronics box (not shown) located under a conveyor, adjacent to a conveyor, or elsewhere on the robotic carton unloader 100b. The PLC 111 may operate all or part of the robotic carton unloader 100b autonomously and may receive positional information from the distance sensors 618. The I/O module 614 may connect the actuators and the distance sensors 618 to the PLC 111.

The robotic carton unloader 100b may include a vision system 616 that comprises sensor devices 616b (e.g., cameras, 3D sensors, etc.) and one or more computing device 616a (referred to as a personal computer or "PC" 616a). The robotic carton unloader 100b may use the sensor devices 616b and the one or more PC 616a of the vision system 616 to scan in front of the robotic carton unloader 100b in real time or near real time. The forward scanning may be triggered by the PLC 111 in response to determining the robotic carton unloader 100b, such as a trigger sent in response to the robotic carton unloader 100b being in position to begin detecting cartons in an unloading area. The forward scanning capabilities may be used for collision avoidance, sizing unloaded area (e.g., the truck or trailer), and for scanning the floor of the unloaded area for loose items (e.g., cartons, boxes, etc.). The 3D capabilities of the vision system 616 may also provide depth perception, edge recognition, and may create a 3D image of a wall of items (or carton pile). The vision system 616 may operate alone or in concert with the PLC 111 to recognize edges, shapes, and the near/far distances of articles in front of the robotic carton unloader 100b. For example, the edges and distances of each separate carton in the wall of items may be measured and calculated relative to the robotic carton unloader 100b, and vision system 616 may operate alone or in concert with the PLC 111 to may select specific cartons for removal.

In some embodiments, the vision system 616 may provide the PLC with information such as: specific XYZ coordinate locations of cartons targeted for removal from the unloading area, and one or more movement paths for the robotic arm 104 or the mobile body of the robotic carton unloader 100b to travel. The PLC 111 and the vision system 616 may work independently or together such as an iterative move and visual check process for carton visualization, initial homing, and motion accuracy checks. The same process may be used during vehicle movement, or during carton removal as an accuracy check. Alternatively, the PLC 111 may use the move and visualize process as a check to see whether one or more cartons have fallen from the carton pile or repositioned since the last visual check. In alternate embodiments, the described computing devices and/or processors may be combined and the operations described herein performed by separate computing devices and/or processors may be performed by less computing devices and/or processors, such as a single computing device or processor with different modules performing the operations described herein. As examples, different processors combined on a single circuit board may perform the operations described herein attributed to different computing devices and/or processors, a single processor running multiple threads/modules may perform operations described herein attributed to different computing devices and/or processors, etc.

An extendable conveyor system 110 can convey articles from the robotic carton unloader 100b to other portions of a material handling system. As the robotic carton unloader 100b advances or retreats, any one of the measurement system 130 or 140 on the robotic carton unloader 100b or the extendable conveyor can potentially be used to locate the extendable conveyor 110. Wireless interfaces 120 and 122 respectively of the robotic carton unloader 100b and the extendable conveyor 110 can convey angular, position and distance information or movement commands. For example, PLC 111 can command an extension motion actuator on the extendable conveyor 110 to correspond to movements of the robotic carton unloader 100b to keep the extendable conveyor system 110 and the robotic carton unloader 100b in alignment and in proper spacing. In one embodiment, the wireless interfaces 120 and 122 utilize a short range wireless communication protocol such as a As used herein, processors may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then,"

"next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For clarity, the robotic carton unloader 100*b* (FIG. 1) is described herein as unloading cartons, which can be corrugated boxes, wooden crates, polymer or resin totes, storage containers, etc. The manipulator head can further engage articles that are products that are shrink-wrapped together or a unitary product. In one or more embodiments, aspects of the present innovation can be extended to other types of manipulator heads that are particularly suited to certain types of containers or products. The manipulator head can employ mechanical gripping devices, electrostatic adhesive surfaces, electromagnetic attraction, etc. Aspects of the present innovation can also be employed on a single conventional articulated arm.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will he further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof that is said to be incorporated by reference herein, but which conflicts with existing definitions, statements, or other disclosure material set forth herein, will only be incorporated to the extent that no conflict arises between that incorporated material and the existing disclosure material. It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

The invention claimed is:

1. A measurement system used in conjunction with a conveyor, comprising:
    a first sensor with a first transceiver and a second sensor with a second transceiver mounted on a fixed portion of the conveyor, wherein the first transceiver and the second transceiver respectively transmit a first light beam and a second light beam towards a movable portion of the conveyor;
    a control unit communicably coupled to the first sensor and the second sensor, wherein the control unit is configured to:
        calculate a first distance between the first sensor and the movable portion based on the first sensor detecting a first reflection of the first light beam from the movable portion of the conveyor while it is moving;
        calculate a second distance between the second sensor and the movable portion based on the second sensor detecting a second reflection of the second light beam from the movable portion of the conveyor while it is moving;
        determine a difference value between the first distance and the second distance; and
        stop a movement of the movable portion of the conveyor in response to the difference value being is above a predefined threshold value.

2. The measurement system of claim 1, wherein the movable portion comprises a reflector, wherein the reflector reflects the first light beam and the second light beam.

3. The measurement system of claim 1, wherein the conveyor is an extendable conveyor.

4. The measurement system of claim 1, wherein the first transceiver and the second transceiver use at least one of visible, infra-red (IR) and ultraviolet (UV) light beams.

5. The measurement system of claim 1, wherein the conveyor comprises one or more movable portions nested within the fixed portion and extendable along a same plane of the fixed portion in a horizontal axis.

6. The measurement system of claim 1, wherein the predefined threshold value is associated with a deviation in distances values within a predefined safe zone corresponding to the movable portion of the conveyor, and wherein the distance values are obtained from the first sensor and the second sensor.

7. A manipulation system for loading and unloading cartons from a trailer comprising: a robotic carton unloader;
    a first conveyor configured to receive the cartons thereon from the robotic carton unloader during an unloading process, wherein the first conveyor comprises a first sensor with a first transceiver mounted on the first conveyor to emit a light beam of a first wavelength;

a second conveyor positioned at a rear end of the first conveyor to receive the cartons from the first conveyor and transfer the cartons to a processing station;

wherein the second conveyor comprises a measurement system to identify a position of the second conveyor in relation to the first conveyor, and wherein the measurement system comprises:
- a second sensor with a second transceiver mounted on a fixed portion of the second conveyor, wherein the second transceiver emits a light beam of a second wavelength;
- a reflector mounted on a movable portion of the second conveyor to reflect light beams back to the first sensor and the second sensor;
- a control unit communicably coupled to the first sensor and the second sensor, wherein the control unit is configured to:
  - calculate a first distance between the first sensor and the reflector;
  - calculate a second distance between the second sensor and the reflector, wherein the first distance and the second distance are calculated based on the reflected light beams while the movable portion is in motion;
  - determine a position of the movable portion of the second conveyor based on the first distance, the second distance and a length of the robotic carton unloader;
  - determine if the robotic carton unloader is within a safe zone based on the position; and
  - stop a movement of the robotic carton unloader when it is not within the safe zone.

8. The manipulation system of claim 7, wherein the length of the robotic carton unloader is predefined.

9. The manipulation system of claim 7, wherein the safe zone is a predefined distance from a fixed portion of the first conveyor.

10. The manipulation system of claim 9, wherein the control unit is further configured to determine if the movable portion of the second conveyor is within the predefined distance.

11. The manipulation system of claim 7, wherein the first conveyor is a Motorized Drive Roller (MDR) conveyor and the second conveyor is an extendable conveyor.

12. A method for controlling an unloader comprising:
- calculating a first distance between a first sensor and a reflector based on a first reflected light beam received by the first sensor;
- calculating a second distance between a second sensor and the reflector based on a second reflected light beam received by the second sensor, wherein the first sensor and the second sensor are positioned on a fixed portion of the unloader and the reflector is positioned on an extendable portion of the unloader;
- determining a difference value between the first distance and the second distance; and
- stopping a movement of the unloader in response to determining that the difference value is above a predefined threshold value.

13. The method of claim 12, wherein the predefined threshold value is associated with a maximum deviation in distances values within a predefined safe zone corresponding to the movable portion of the conveyor, and wherein the distance values are obtained from the first sensor and the second sensor.

14. The method of claim 12, further comprising:
- stopping the movement of the unloader when the reflected light beams are not received by at least one of the first sensor or the second sensor.

15. The method of claim 12, further comprising:
- determining a position of the extendable portion of the unloader based on the first distance and the second distance during a movement of the unloader;
- determining whether the unloader is within a safe zone based on the position; and
- stopping a movement of the unloader in response to determining the extendable portion of the conveyor is not in the safe zone.

16. The method of claim 15, further comprising:
- periodically determining whether the unloader is within the safe zone and, as applicable, moving the unloader in response to determining that the difference value is below the predefined threshold value.

* * * * *